March 6, 1951 W. W. HIGGINS 2,544,458
SELECTIVE CAPACITY WATER HEATER
Filed Dec. 13, 1948
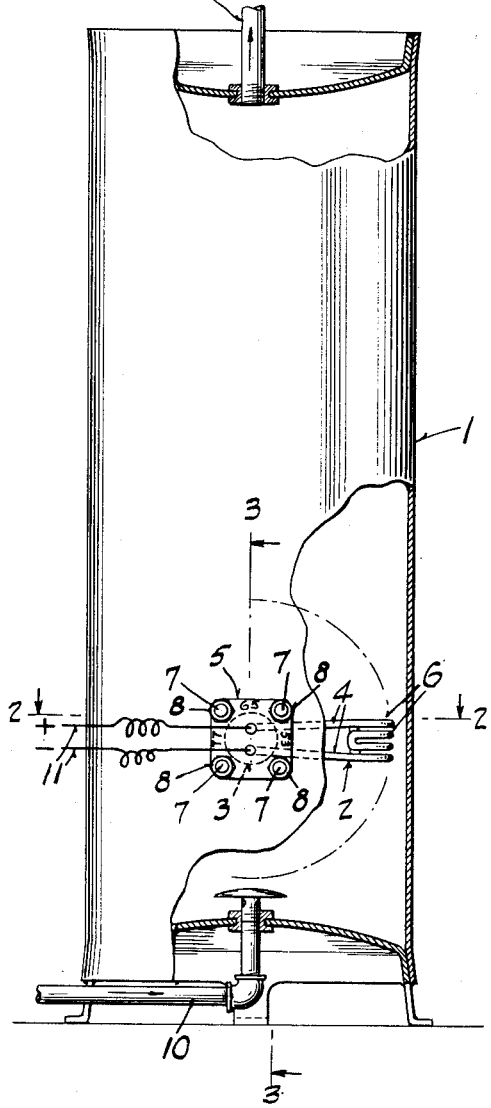
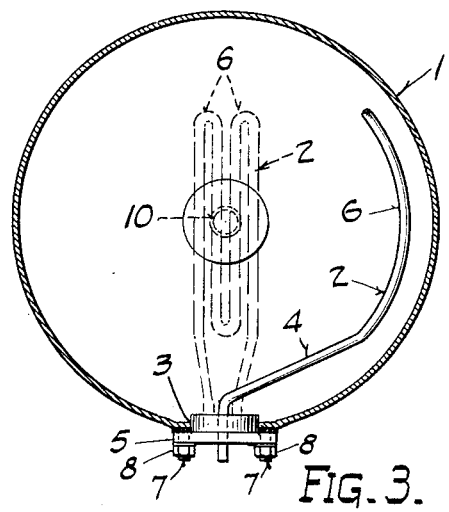
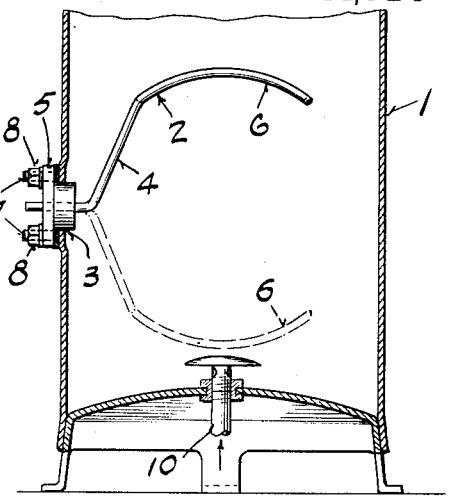
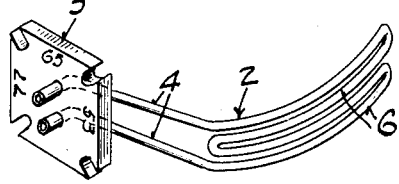
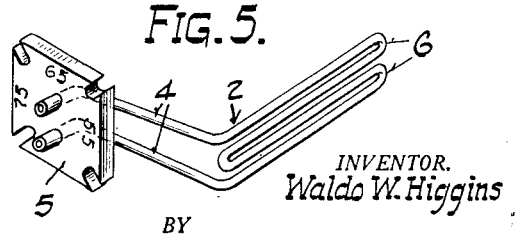
INVENTOR.
Waldo W. Higgins
BY
Andrus & Sceales
ATTORNEYS.

Patented Mar. 6, 1951

2,544,458

UNITED STATES PATENT OFFICE 2,544,458

SELECTIVE CAPACITY WATER HEATER

Waldo W. Higgins, Kankakee, Ill., assignor to A. O. Smith Corporation, Milwaukee, Wis., a corporation of New York Application December 13, 1948, Serial No. 64,955

5 Claims. (Cl. 219—39)

This invention relates to a water heater and has particular reference to a water heater in which the heating element is adjustable to selective positions to vary the quantity of hot water made available by the heater.

The principal object of the invention is to provide a water heater adapted to supply various selected quantities of hot water.

Another object is to provide a water heater of selective capacity to eliminate costs attendant upon the purchase and installation of heaters with different capacities as hot water requirements change.

A further object is to provide a water heater wherein a simplified adjustment of the electric heating element makes it possible to supply varying quantities of hot water with low costs to make the change in capacity.

A further object is to provide a water heater of selective capacity in which the heating element can be adjusted readily to different positions from outside the heater.

Another object is to provide a rotatable heating element for a water heater with offset coils to assume different positions in the heater upon rotation.

These and other objects of the invention will appear hereinafter in connection with the following description of several embodiments of the invention as disclosed in the accompanying drawing.

In the drawing:

Figure 1 is a side elevational view partly in section of an electrically heated hot water tank showing the heating element in intermediate position;

Fig. 2 is an enlarged transverse section taken on the line 2—2 of Figure 1, showing the heating element by full lines in intermediate position and by broken lines in lower position;

Fig. 3 is a vertical section taken on line 3—3 of Figure 1 with the heating element shown by full lines in upper position and by broken lines in lower position;

Fig. 4 is a perspective view of the heating element shown in the preceding figures; and Fig. 5 is a perspective view of a heating element in which the coil is shown as straight.

The drawings illustrate in general a metal water heater tank 1 in which the water in the tank is heated by the electric heating element 2 which projects into the tank through a suitable opening 3 in the wall thereof.

Element 2 comprises a pair of nonheating leads or supports 4 of suitable noncorrosive metal which are secured at one end to the flange 5 located on the outtside of tank 1 and merge at the other end into the heating coils 6.

Flange 5 is of a generally square shape and is apertured at the corners to enable assembly over four equally spaced studs 7, which are welded to the tank wall around opening 3. The outer ends of studs 7 are threaded to receive nuts 8 which are threaded home on the studs against flange 5 to secure the element in place.

Opening 3 is suitably sealed to prevent escape of fluid between flange 5 and the wall of tank 1 around the opening. The sealing means and support for flange 5 may be of different constructions and form no part of the invention.

Coils 6 are offset from a center line through flange 5 to enable adjustment of the coils to different heights within the tank by rotating the coils, as will be described. As illustrated in Figs. 1 to 4, inclusive, coils 6 may be shaped to the curvature of the tank or, as shown in Fig. 5, the coils may extend straightly from the nonheating leads or supports 4 in the position of a chord to the curved coils. The curved coils are preferred so as to enable locating the coils to higher and lower positions in the tank than is obtainable by the straight coils.

The invention is predicated on the fact that hot water within the tank stratifies upon heating so that the heated water occupies that portion of the tank above the heating coils 6 and relatively cold water is disposed below the coils. Thus by moving the heating coils to variable positions within the tank the depth or quantity of the water heated within the tank may be changed.

As shown in the particular illustration, hot water is drawn off from the top of tank 1 through pipe 9 and cold water enters the tank at the bottom through pipe 10. Electric current is supplied to the heating element by leads 11.

For purposes of illustration, assume that the capacity of tank 1 is eighty gallons and that coils offset and shaped to the curvature of the tank are provided. With a construction for supporting the heating coils 6 as above-described, coils 6 may be moved to three different positions within the tank merely by removing nuts 8 from studs 7 and rotating flange 5 either to the right or left so that it is located on studs 7 in different rotative positions.

Thus if the flange 5 is located in one position, the coils 6 assume an uppermost location, as illustrated in Fig. 3, and the water above the coils is hot while that below is relatively cold. In the uppermost position of the coils, in the illustration of the invention, when an eighty gallon tank is employed, fifty-three gallons of hot water are available.

When the coils 6 are moved to an intermediate position by rotation of flange 5, as in Figure 1, sixty-five gallons of hot water are available, and in the lowermost position of the coils, seventy-seven gallons of hot water are available.

If straight coils, as illustrated in Fig. 5, are employed, then upon movement of the coils to uppermost, intermediate and lowermost positions, the hot water available becomes, respectively, fifty-five gallons, sixty-five gallons and seventy-five gallons.

Some suitable marking may be provided on flange 5 so that the serviceman can ascertain the gallons of hot water made available by the various positions of the flange.

The change over from one capacity of another is readily made from outside the tank. Any service charges that may be required to convert a tank to several different capacities of hot water delivery are held to a minimum. Thus one tank serves where before at least three were required.

Th invention is, of course, applicable to different sized tanks, and the gallons of hot water to be delivered may be varied in different tanks and in the same tank by proper construction of the element.

The particular support for the coils including the flange 5 and studs 7 are merely illustrative of one type of connection which may be employed as the invention is directed solely to a heating element adjustable to different positions within the tank from the outside.

Various embodiments of the invention may be employed within the scope of the accompanying claims.

I claim:

1. In a hot water tank adapted for providing selected quantities of hot water, an electric heating element comprising a non-heating support mounted in an opening in the wall of said tank and projecting inwardly of the tank with the inner portion thereof offset laterally from said opening, a heating coil extending within said tank from the offset portion of said support, and means to rotate the support to move said heating coil to a plurality of selected heating positions within the tank to supply selected quantities of hot water under stratification of the water wherein the water above the heating coil is hot and the water below the heating coil remains relatively cold.

2. In a hot water tank adapted for providing selected quantities of hot water, an electric heating element comprising a support mounted on the wall of said tank, elongated non-heating lead members secured to said support and projecting laterally therefrom into said tank, heating coils extending within said tank and secured to the inner end of said non-heating leads, and said support being rotatable to rotate said non-heating members to locate said coils in a plurality of selected heating positions to supply selected quantities of hot water under stratification of the water wherein the water above the coils is hot and the water below the coils remains relatively cold.

3. In a hot water tank adapted for providing selected quantities of hot water, an electric heating element comprising a support mounted on the wall of said tank and coils extending within said tank, said coils being offset from said support and shaped to the curvature of the tank wall, and said support being rotatable to rotate said coils to a plurality of selected heating positions to supply selected quantities of hot water under stratification of the water wherein the water above the coils is hot and the water below the coils remains relatively cold.

4. In a hot water tank adapted for providing selected quantities of hot water, a flange member secured to the wall of the tank around an opening therein sealed against leakage of water contained in the tank, heating coils disposed within said tank to heat water therein and supported from said flange member in a position radially offset from the flange member by non-heating lead members extending between the coils and flange, and said flange member being adapted to be secured to the wall of the tank in a plurality of different radial positions to change the location of said coils within the tank for supplying selected quantities of hot water under stratification of the water wherein the water above the coils is hot and the water below the coils remains relatively cold.

5. An electric storage water heater comprising a vertically disposed water storage tank having a side wall with an opening therein, an electric heating element disposed within the tank, a support for said heating element disposed in and closing said opening in the side wall of the tank and adapted to carry the entire heating element radially offset from the opening, and means to secure said support in a selected rotational position to said tank wall whereby the heating element may be disposed at a selected height within the tank to supply a predetermined quantity of hot water under stratification between the hot water above the element and the relatively cold water below the element.

WALDO W. HIGGINS.

REFERENCES CITED

The following references are of record in the file of this patent:

UNITED STATES PATENTS

| Number | Name | Date |
|---|---|---|
| 1,698,596 | Hynes | Jan. 8, 1929 |
| 2,375,871 | Reifenberg | May 15, 1945 |
| 2,380,545 | Pankow | July 31, 1945 |